(12) United States Patent
Roemer et al.

(10) Patent No.: US 12,075,250 B1
(45) Date of Patent: Aug. 27, 2024

(54) TECHNIQUES TO ENABLE SECURE DATA COMMUNICATION BETWEEN A FIRST NETWORK AND A SECOND NETWORK THAT COMPRISE AT LEAST IN PART A DIFFERENT COMMUNICATION ENVIRONMENT

(71) Applicant: Deutsche Telekom AG, Bonn (DE)

(72) Inventors: Stefanus Roemer, Hennef (DE); Manuel Biewald, Neustadt am Kulm (DE); Sven Lachmund, Munich (DE); Juergen Baumann, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/570,664

(22) PCT Filed: Jun. 7, 2022

(86) PCT No.: PCT/EP2022/065341
§ 371 (c)(1),
(2) Date: Dec. 15, 2023

(87) PCT Pub. No.: WO2022/263222
PCT Pub. Date: Dec. 22, 2022

(30) Foreign Application Priority Data

Jun. 17, 2021 (EP) .................................... 21180089

(51) Int. Cl.
*H04W 12/12* (2021.01)
*H04W 12/088* (2021.01)
(Continued)

(52) U.S. Cl.
CPC ......... *H04W 12/088* (2021.01); *H04W 12/30* (2021.01)

(58) Field of Classification Search
CPC ... H04W 12/08; H04W 12/088; H04W 12/06; H04W 8/08; H04W 36/00; H04W 12/30; H04W 8/20; H04W 88/06; H04W 4/00
See application file for complete search history.

(56) References Cited

U.S. PATENT DOCUMENTS

| | | | | |
|---|---|---|---|---|
| 2019/0098522 | A1* | 3/2019 | Tenea | H04L 43/028 |
| 2021/0051517 | A1* | 2/2021 | Johansson | H04W 76/12 |
| 2022/0124501 | A1* | 4/2022 | S Bykampadi | H04W 12/088 |

FOREIGN PATENT DOCUMENTS

WO     WO 2020/148330 A1     7/2020

OTHER PUBLICATIONS

GSM Association; "5GS Roaming Guidelines"; Official Document NG. 113; May 28, 2021; pp. 1-53; Version 4.0; XP040721009; GSM Association; Zurich, Switzerland.
(Continued)

*Primary Examiner* — Liton Miah
(74) *Attorney, Agent, or Firm* — Leydig, Voit & Mayer, Ltd.

(57) ABSTRACT

A method to enable secure data communication between a first network of a first network provider and a second network of a second network provider includes: establishing a handover process from a 5G communication environment of a first network to a 4G communication environment of a second network; directing control plane traffic of the data transmission from a security edge protection proxy (SEPP) of the first network to a SEPP of the second network; directing user plane traffic of the data transmission to an access link to the 4G communication environment of the second network and through a GTP-firewall; and providing decrypted control plane traffic to the GTP-firewall, wherein the GTP-firewall performs security measures based on information extracted from the control plane traffic.

15 Claims, 6 Drawing Sheets

(51) Int. Cl.
　　*H04W 12/30*　　(2021.01)
　　*H04W 36/00*　　(2009.01)
　　*H04W 88/16*　　(2009.01)

(56) References Cited

OTHER PUBLICATIONS

GSM Association; "Diameter IPX Network End-to-End Security Solution"; *3rd Generation Partnership Project (3GPP) Draft*, Jun. 21, 2019; pp. 1-16; vol. SA WG3, No. 191845; XP051752794; [Online] Retrieved from internet: http://www.3gpp.org/ftp/tsg%5Fsa/WG3%5FSecurity/TSGS3%5F95Bis%5FSapporo/Docs/S3%2D191845%2Ezip; GSM Association; Zurich, Switzerland.

3rd Generation Partnership Project (3GPP); "3rd Generation Partnership Project; Technical Specification Group Services and System Aspects; Security Aspects; Study on security aspects of the 5G Service Based Architecture (SBA)"; *3GPP Standard—Technical Report—3GPP TR 33.855*; Sep. 25, 2020; pp. 1-103; V16.1.0; XP051961171; [Online] Retrieved from internet: ftp://ftp.3gpp.org/Specs/archive/33_series/33.855/33855-g10.zip 33855-gl0.doc; Mobile Competence Centre; Sophia-Antipolis, France.

3rd Generation Partnership Project (3GPP); "3 Generation Partnership Project; Technical Specification Group Services and System Aspects; Security architecture and procedures for 5G system"; *3GPP Standard—Technical Specification—3GPP TS 33.501*; Apr. 6, 2021; pp. 1-253; V16.6.0; XP052000594; [Online] Retrieved from internet: https://ftp.3gpp.org/Specs/archive/33_series/33.501/33501-g60.zip33501-g60_clean.doc; Mobile Competence Centre; Sophia-Antipolis, France.

\* cited by examiner

TECHNIQUES TO ENABLE SECURE DATA COMMUNICATION BETWEEN A FIRST NETWORK AND A SECOND NETWORK THAT COMPRISE AT LEAST IN PART A DIFFERENT COMMUNICATION ENVIRONMENT

CROSS-REFERENCE TO PRIOR APPLICATIONS

This application is a U.S. National Phase application under 35 U.S.C. § 371 of International Application No. PCT/EP2022/065341, filed on Jun. 7, 2022, and claims benefit to European Patent Application No. EP 21180089.1, filed on Jun. 17, 2021. The International Application was published in English on Dec. 22, 2022 as WO 2022/263222 A1 under PCT Article 21(2).

FIELD

The invention relates to techniques to enable a secure data communication between a first network and a second network that comprise at least in part a different communication environment.

In particular, the invention relates to the typical use case of a roaming situation in which a user has access to a visited network and connects into his home network.

BACKGROUND

During handover process in the context of roaming situations it can happen that different communication standards of the visited network and the home network are applied so that the visited network and the home network need to agree on a common communication standard in the handover process. It can happen that the user is only allowed to use a certain communication standard due to his contract with a network provider. Then the following situation can occur: The user has access to a 5G communication environment in the visited network and roams into his home network that only supports the 4G communication environment. However, such use cases typically lead to technical compatibility problems between the two different communication standards.

In practice so-called GTP firewalls are used to protect 4G core network components in the roaming case.

From 2.5G up to 4G the "un-secure" GTP-protocol is used for both control- and user-plane to handle data services. To protect a Home Public Land Mobile Network (hPLMN) a GTP-Firewall is placed between hPLMN and a foreign IPX-Network, where behind the IPX-Network typically is a Visited Public Land Mobile Network (vPLMN).

These firewalls do not only check for allowed sockets (allowed source IP port and destination IP port), but they are also capable to inspect and validate content of GTP messages (DPI, Deep Packet Inspection). With this information additional security measures like the following are applied:

Validation of message flow and content verification of IEs (Information Elements);
Based on TEIDs (Tunnel Endpoint Identifier) only allow GTP-U data transfer if the corresponding GTP-C was successfully established;
Allowing incoming traffic only for own IMSI and MSISDN prefixes;
Validation of handovers for existing tunnels from one IP-node to another;
Releasing idling tunnels after a defined time limit (depending on used RAT-Type);
Limiting the number of requests per second based on APN to protect internal network elements;

On the other side, in 5G networks there is a strict separation of control plane traffic and user plane traffic. The control plane traffic is authenticated and encrypted by a SEPP (Security Edge Protection Proxy) before it is sent to a roaming network of a roaming partner. As a result of this encryption, a GTP-Firewall that is used for the user plane traffic in 4G cannot read the corresponding control traffic and hence is not able to identify the corresponding GTP tunnels. The leads to the adverse technical effect that the GTP-Firewall loses its capability to apply the above-mentioned security measures. In an "isolated" 5G network, the built-in 5G-security is sufficient to apply the above-mentioned security measures.

In contrast to previous mobile network generations (e.g. 4G), 5G comes with built-in signalling security (Security-by-design to combat fraud & attacks). In particular, 5G introduces secure signalling for roaming over a N32 interface to fix the root cause for attacks and fraud:

Only legitimate roaming partners can send signalling messages;
It can be determined if messages were modified on transit;
Sensitive information in signalling messages is encrypted and not readable on transit;
Incoming messages are checked for their plausibility.

Figure 1:
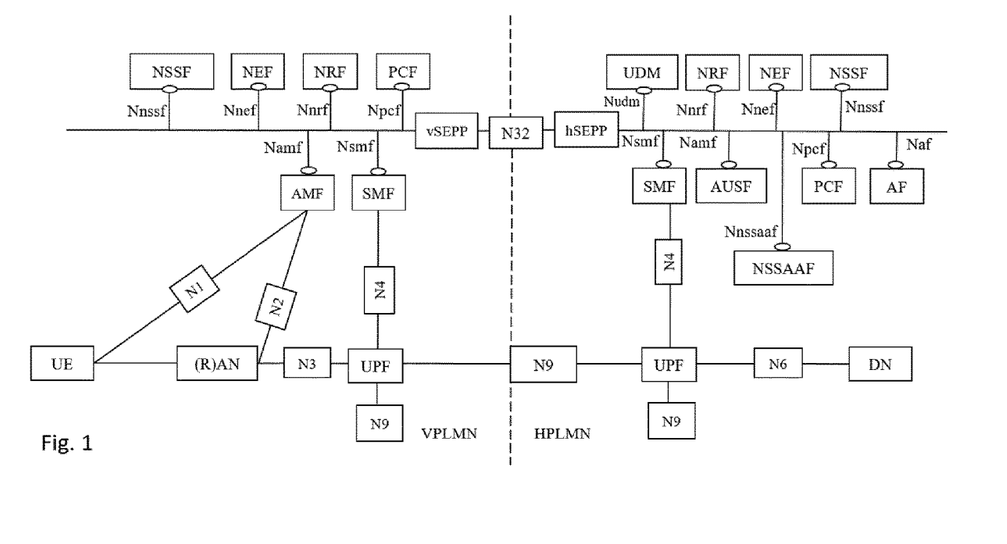
FIG. 1 shows a generic 5G core network with its built-in signaling security features.

FIG. 1 shows a generic 5G core network with its build-in signaling security features: The above-mentioned in-built security mechanisms for 5G roaming are sufficient in a pure 5G roaming scenario when a 5G user is registered in a visited 5G public land mobile network (vPLMN) and establishes data connections back to the home public land mobile network (hPLMN). Such a scenario is referred to as "outbound roaming in a visited 5G network".

However, when seamless handover from 5G to 4G and/or from 4G to 5G in the vPLMN shall be supported, compatibility problems occur due to the different security measures. The GTP-Firewall is not capable to read the encrypted 5G control traffic.

WO 2020/148330 A1 teaches a user plane network entity of a 5G core network that performs: obtaining GPRS Tunneling Protocol User Plane (GTP-U) tunneling information of a new or updated protocol data unit (PDU) session from a control plane network entity of the 5G core network; and adjusting according to the obtained GTP-U tunneling information a GTP-U firewall for selectively allowing to pass through only GTP-U traffic concerning GTP-U tunnels defined by the GTP-U tunneling information. The control plane network entity performs: obtaining from control plane signaling the GTP-U tunneling information and communicating same to the GTP-U firewall. However, WO 2020/148330 A1 does only teach a pure 5G solution without addressing capability problems that occur during a handover process if the hPLMN supports 4G and the vPLMN supports 5G or the other way round. In addition, the method according to WO 2020/148330 A1 creates a great load of data traffic to obtain the necessary GPRS Tunneling Protocol User Plane (GTP-U) tunneling information.

SUMMARY

In an exemplary embodiment, the present invention provides a method to enable secure data communication between a first network of a first network provider and a second network of a second network provider. The first network comprises at least a first part that is a 5G communication environment, the second network comprises at least a first part that is a communication environment preceding the 5G communication environment, and an access link to the first part of the second network comprises a GPRS Tunneling Protocol (GTP)-firewall to protect the first part of the second network. The method comprises the following steps: establishing a handover process from the 5G communication environment of the first network to the non-5G first part of the second network, in particular to a 4G communication environment of the second network; directing control plane traffic of the data transmission from a security edge protection proxy (SEPP) of the first network to a SEPP of the second network, wherein the SEPP of the first network encrypts the data transmission and the SEPP of the second network decrypts the encrypted data transmission; directing user plane traffic of the data transmission to the access link to the non-5G first part of the second network and through the GTP-firewall; and providing the decrypted control plane traffic to the GTP-firewall, wherein the GTP-firewall performs security measures based on information extracted from the control plane traffic.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention efficiently provide a GTP-Firewall with the necessary information to protect 2G, 3G and 4G core network components in the roaming case.

The features of the various aspects of the invention described below or the various examples of implementation may be combined with each other, unless this is explicitly excluded or is technically impossible.

According to a first aspect of the invention, a method to enable a secure data communication between a first network of a first network provider and a second network of a second network provider is provided, wherein the first network comprises at least a first part that is a 5G communication environment, wherein the second network comprises at least a first part that is a communication environment preceding the 5G communication environment and wherein an access link to the first part of the second network comprises a GTP-firewall to protect the first part of the second network; in other words: the first part of the second network runs on a non-5G technique, such a technique can be for example according to 4G mobile communication protocols.

The method comprises the following steps:

Establishing a handover process from the 5G communication environment of the first network to the non-5G first part of second network; during the handover process, the hPLMN and the vPLMN agree on the standard they shall use for further data transmission. If the non-5G first part of second network is 4G, then they will agree on both using 4G for data transmission. However, to facilitate this handover process in a secure way, certain information of the 5G control traffic is necessary in order to run the GTP-firewall properly before data is transmitted to the 4G core network. This is a typical roaming use case that introduces the challenge that each of the network providers wants to secure his own network from unauthorized communications coming from a foreign network.

Directing a control plane traffic of the data transmission from a vSEPP of the first network to a hSEPP of the second network; wherein the vSEPP of the first network encrypts the data transmission and the hSEPP of the second network decrypts the encrypted data transmission; as already the name indicates, the SEPPs (Security Edge Protection Proxy) provide a security measure by performing the encryption.

Directing user plane traffic of the data transmission to the access link to the non-5G first part of the second network and through the GTP-firewall; this is the case, if for some reasons the second network does not provide a 5G environment for the user plane traffic. This can be due to system requirements, system failure or due to contract conditions between the network provider and the user.

Providing the decrypted control plane traffic to the GTP-firewall, wherein the GTP-firewall performs security measures based on information extracted from the control plane traffic.

This provides the advantage that a seamless handover from 5G to 4G and/or from 4G to 5G in the vPLMN is enabled. One possible use case is if a user communicates with his user equipment, like a smartphone, in a roaming situation. When a seamless handover from 5G to 4G and/or from 4G to 5G in the vPLMN is supported, the additional so-called GTP-FW at the border between the hPLMN and the vPLMN is needed in order to maintain the security level and to protect against attacks and fraud. The GTP-FW needs to be informed about these handover events, e.g. by a Modified bearer signaling message. This is facilitated by providing the decrypted control plane traffic to the GTP-firewall.

In particular, for validation of new or existing tunnel connections for the user data (GTP-U tunnels), the knowledge of at least the source and destination IP and port of the involved GSNs/UPFs and a valid Tunnel Endpoint ID (TEID) for both directions is necessary to apply security rules by the GTP-firewall. Additional information elements (IEs) like SUPI, PLMN-ID etc. can be available to the GTP-FW to perform further validity checks in handover scenarios. The SUPI can comprise an IMSI and/or a line-ID.

In an embodiment, the GTP-firewall blocks data traffic to the non-5G first part of the second network as a security measure.

This provides the advantage that the GTP-firewall of the second network can efficiently secure the non-5G first part of the second network. The non-5G first part of the second network can be a 4G core network. If the non-5G first part of the second network is a 4G core mobile network, this provides the advantage that the typical use cases of roaming situations are covered.

In an embodiment, the first network is a vPLMN network and the second network is a hPLMN network designed for roaming use cases.

If all the data communication occurs within the network of a single network provider, then even the switch from a 5G communication protocol to a 4G communication protocol is not causing capability problems as pointed out in the introduction of this disclosure because the network provider basically has all the necessary information ready. In such a situation the attack from the outside cannot occur because all the communication is within one single network. However, if the first network is a hPLMN network and the second network is a vPLMN network designed for roaming use cases, this advantageously covers the typical use case of roaming scenarios that play an important role if the user wants to communicate from abroad.

In an embodiment, the GTP-firewall is located at the interface between the hPLMN network and the vPLMN network.

This provides the advantage that the GTP-firewall can decide very soon if it blocks the data traffic to the core of the hPLMN network. If the GTP-firewall would logically be located deeper within the hPLMN network this would cause an unnecessary security risk and an unnecessary use of computational resources if the GTP-firewall would decide to block the data traffic anyway.

In an embodiment, the first network comprises a second part that is a communication environment preceding a 5G communication environment and/or wherein the second network comprises a second part that is a 5G communication environment.

This provides the advantage that the switch from 4G to 5G and from 5G to 4G is possible in any direction between the two networks. Another advantage is that the 5G communication infrastructure of the second network can be used to provide the decrypted control plane traffic to the GTP-firewall. For example, the hSEPP of the 5G part of the second network can be used to decrypt the control plane traffic for the GTP-firewall.

In an embodiment, the GTP-FW is implemented within the SEPP of the second network, in particular within the hSEPP of the HPLMN network. This provides the advantage that providing the decrypted control plane traffic to the GTP-firewall only causes internal traffic within the SEPP of the second network. In addition, this is one possibility to perform the security measures of the GTP-FW logically at the edge of the second network. Further advantages are reduced complexity for network or SBA integration. Less internal signaling traffic within the SBA. Efficient interworking with the GTP-FW why are in the process communication that allows a very efficient implementation. However, on the downside the hSEPP gets more complex and there is a tight coupling between control plane (CP) and user plane (UP) within the hSEPP that may narrow down landscape of a vendor. SBA means Service Based Architecture (as defined by 3GPP TS 29.571) where service producers offer their services to a service consumer over a so-called service based interface (SBI) based on http/2—JSON requests. The service producer registers the profile of its service based interfaces with all parameters in a central Network Repository Function (NRF). The service consumer can query the NRF for a specific SBI. This new architecture allows for loosely coupled network functions which can scale independently of each other. The SBA is a key concept of a 5G standalone core.

In an embodiment, the SEPP stores the decrypted control plane traffic within an internal database along with an associated time stamp, and the GTP-FW regularly checks new entries of that database or the SEPP notifies the GTP-FW about new entries within the database.

This provides the advantage of an efficient mechanism to trigger the activity of the GTP-FW and an efficient method for the GTP-FW to find the relevant entries.

In an embodiment, a copy of the N4 traffic is transmitted to the GTP-FW. This provides the advantage of a loose coupling between the CP and the UP that enhances the flexibility with respect to the design of the network for the network operator. However, as a downside, copying and analyzing of complete N4 traffic consumes a lot of resources. In addition, an N4 is not a REST API but is connection-orientated based on GTP-C. So, a new N4 connection needs to be configured to the GTP-FW.

In an embodiment, the GTP-FW is provided with information elements that are a subset of the decrypted control plane traffic.

This provides the advantage of providing only information elements to the GTP-FW that are actually needed to perform its security measures. As stated above, copying and analyzing of complete N4 traffic consumes a lot of resources. This is circumvented by selecting only certain information elements that are necessary to perform the security measures and making them available to the GTP-FW.

In an embodiment, the GTP-FW gets the information elements that are a subset of the control plane traffic from SMFs that are related to traffic management from the first part of the first network to the first part of the second network. SMF means Session Management Function as defined by 3GPP TS29.508.

Basically, this is the preferred solution because it also provides loose coupling between the CP and the UP. This also provides the advantage of high flexibility and scalability because new SMFs and UPF (UPF: User Plane Function as defined by TS29.281) can easily be added. The additional internal SBA signaling traffic to provide the GTP-FW with the information elements is only recused in roaming cases. The amount of the additional SBA traffic is not increased that much because the information elements are only a subset of the control plane traffic.

In an embodiment, the GTP-FW performs the following steps:
  Registering with a service profile in a NRF;
  Asking the NRF for all SMFs that serve roaming traffic;
  Subscribing to a notification service of all SMFs that serve roaming traffic, wherein the SMFs send selected information elements to the GTP-FW.

This provides the advantage of selecting the appropriate information elements from the decrypted control plane traffic. This also provides an efficient measure to trigger the activity of the GTP-FW.

In an embodiment, the GTP-FW gets the information elements that are subset of the control plane traffic from a NEF (Network Exposure Function).

This provides the advantage of a complete decoupling from SBA. A further advantage is topology hiding of internal SBA. As a downside, this alternative provides less efficient interworking with the GTP-FW in terms of message delay, and controlling the session depends on the offered NEF functionality.

In an embodiment, the hPLMN network and/or the vPLMN are cellular networks.

This provides the advantage that the method can be used in the very frequent use cases if users access the communication network by their smartphones or other user equipment in roaming situations.

According to a second aspect of the invention, a communication system to enable secure data communication between a first network of a first network provider and a second network of a second network provider is provided, the communication system comprising
the first network that comprises at least a first part that is a 5G communication environment,
the second network that comprises at least a first part that is a communication environment preceding the 5G communication environment; and
an access link to the first part of the second network with a GTP-firewall to protect the first part of the second network;
wherein the communication system is configured to perform the steps according to the method described above.

The communication system basically provides the same advantages as already described within the context of the method.

In the following, preferred implementation examples of the present invention are explained with reference to the accompanying figures:

In the following, numerous features of the present invention are explained in detail via preferred embodiments. The present disclosure is not limited to the specifically named combinations of features. Rather, the features mentioned here can be combined into other embodiments, unless this is expressly excluded below.

In roaming scenarios when a seamless session handover from 5G network of a vPLMN to a 4G network of a hPLMN shall be established, special control plane information—such as for example the TEID-shall be available for the GTP-firewall that is used for 4G traffic in order to verify the correctness of any new or existing GTP-U tunnel on the N9 interface. Handover from 5G to 4G means that the technology is changed in both hPLMN and vPLMN. The same applies to the reverse case, 4G to 5G. Practically always triggered by the vPLMN.

Figure 2:
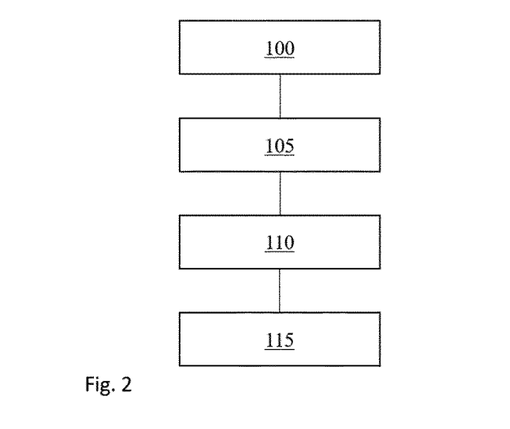
FIG. 2 shows a flow diagram of a method according to the invention.

FIG. 2 shows a flow diagram according to the invention with the following steps:
Step 100: Establishing a data transmission according to 5G protocols from the 5G communication environment 150 of the first network 155 to the 4G first part 186 of the second network 165;
Step 105: Directing control plane traffic of the data transmission from a SEPP 170 of the first network 155 to a hSEPP 175 of the second network 165; wherein the vSEPP 170 of the first network 155 encrypts the data transmission and the hSEPP 175 of the second network 165 decrypts the encrypted data transmission;
Step 110: Directing user plane traffic of the data transmission via the access link 180 to the 4G first part 186 of the second network 165 and through a GTP-firewall 185;
Step 115: Providing the decrypted control plane traffic to the GTP-firewall 185, wherein the GTP-firewall 185 performs security measures based on information extracted from the control plane traffic.

The second network 165 typically comprises a 5G part, too. The 5G part of the second network 165 comprises a control plane part 168 and a user plane part 160. The technical infrastructure of the 5G control plane part 168 can be used to facilitate the invention according to the inventive method.

Figure 3:
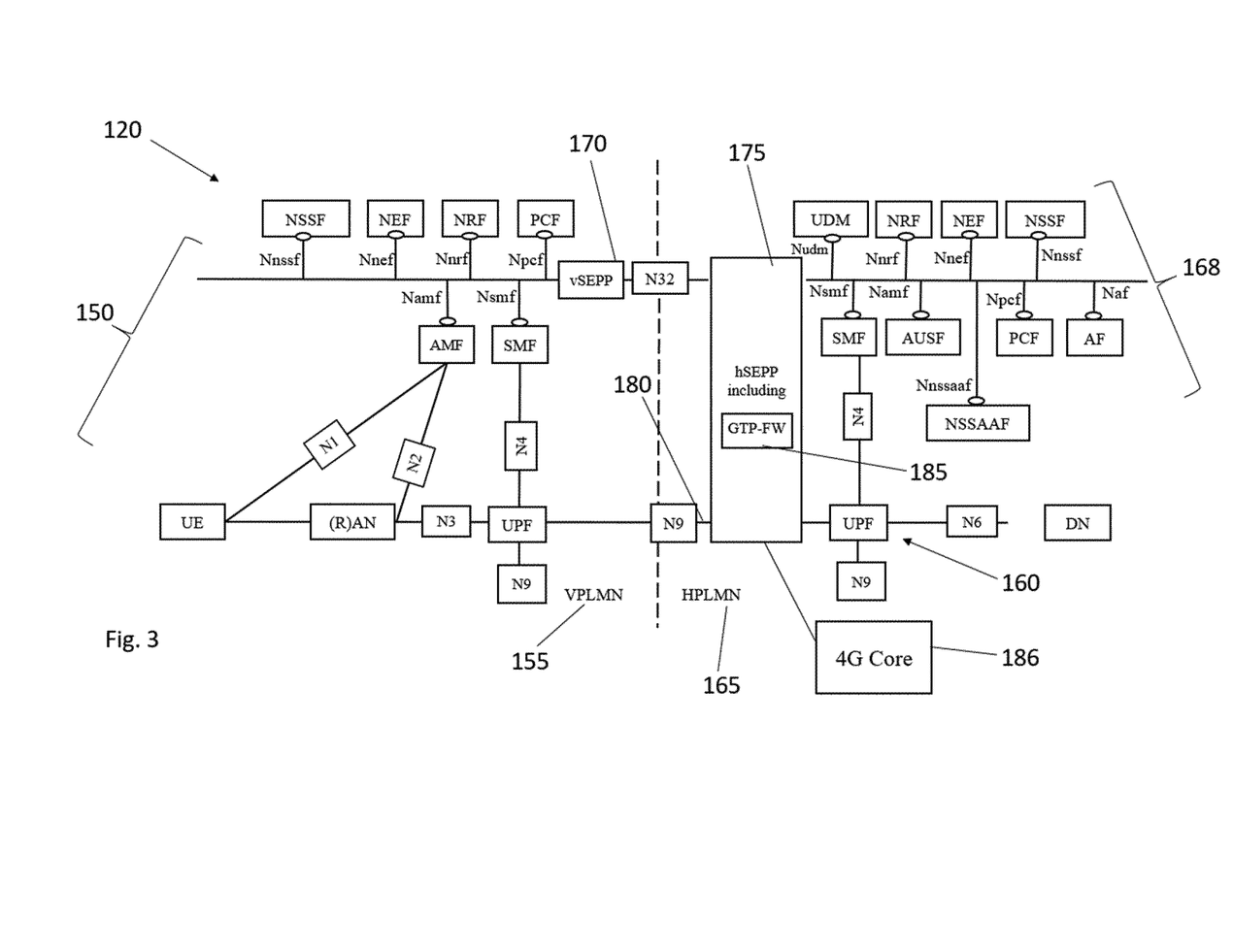
FIG. 3 shows a first embodiment of the method according to FIG. 2 within a communication system.

FIG. 3 shows a first embodiment of the method according to FIG. 2 within a communication system 120.

In this embodiment, the GTP-FW 185 is fully integrated within the hSEPP 175 function. The hSEPP 175 handles all control traffic between the vPLMN 155 and the hPLMN 165 and therefore has access to the information elements such as TEID, SUPI, PLMN-ID for any new roaming connection. The GTP-FW 185 can receive these information elements via an internal inter process interface from the hSEPP 175 to perform a security assessment.

For example, the required information can be stored in a shared data memory—e.g. a file or an internal database. In this procedure, the hSEPP 175 writes each change with a time stamp to the shared data store and the GTP-FW 185 periodically searches for new entries. Alternatively, the GTP-FW 185 can be informed via an internal notification that there is a new entry. In all embodiments according to the invention, the GTP-FW 185 is logically placed before the 4G Core 186 of the second network, i.e. the first part of the second network 165.

Figure 4:
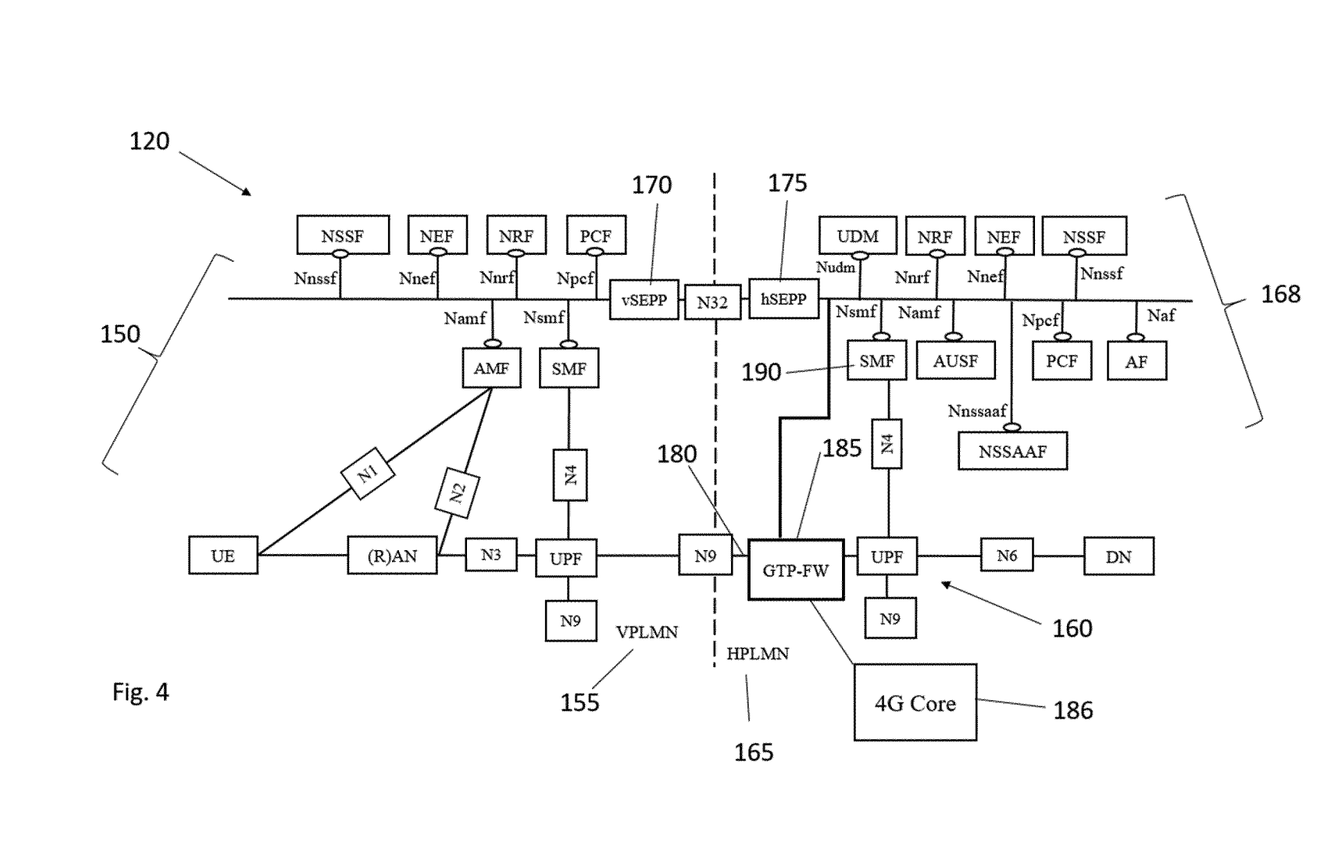
FIG. 4 shows a second embodiment of the method according to FIG. 2 within a communication system.

FIG. 4 shows a second embodiment of the method according to FIG. 2 within the communication system 120. FIG. 4 shows an integration of the GTP-FW 185 within a SBA in order to subscribe to relevant control plane events within a SMF 190.

In FIG. 4, the GTP-FW 185 registers with a service profile at the NRF 195. The service profile contains entries, such as: NF type, NF instance ID, NF service name, Serving PMNL-ID, S-NSSAI, DNN and/or FQDN. NRF: Network Repository Function as described by 3GPP TS29.510: Central "information service for all Network Functions within the SBA. By registering in the NRF, the respective network function makes itself known within the SBA as a producer and available to consumers. At the same time, the NF in question can ask specifically for other NFs and then use their services. In concrete terms, this means that only after the GTP-FW has registered in the NRF can it ask for SMFs that are active within the roaming slice. It is also possible to use subscription updates to get further information elements.

After successful registration at the NRF 195, the GTP-FW 185 asks the NRF 195 for all SMFs 190 that belong to the same network slice (S-NSSAI) and DNN that provides roaming traffic or roaming connections, e.g. depending on parameters such as DNN, S-NSSAI, NF type.

In the next step, GTP-FW 185 subscribes to all these SMFs 190 for an event notification service to receive the necessary information elements such as TEID, SUPI, PLMN-ID for any new roaming connection, e.g. based on a handover.

The GTP-FW 185 will also subscribe to all these SMFs for any termination event for active roaming connection. This termination event notification shall contain the necessary information elements such as TEID, SUPI, PLMN-ID in order to identify the corresponding GTP-U connection and to terminate this connection within the GTP-FW 185.

Hence, according to the embodiment of FIG. 4, the GTP-FW 185 is also provided with a selection of information, i.e. a subset of the decrypted control traffic, to perform the security measures. As FIG. 4 shows, this information is directed to the GTP-FW 185 after it has been decrypted by the hSEPP 175. The same is true within the context according to all embodiments. hSEPP 175 decrypts the control plane traffic.

The advantage of the solution according to FIG. 4 is that the required control plane information is pre-selected by the SMFs 190 and only these information elements are sent by notification from the SMFs 190 to the GTP-FW 185. Hereby the amount of additional signaling traffic is minimized and a more efficient implementation of the GTP-FW 185 can be achieved. Alternatively, an additional Service Control Proxy (SCP) can be used as an intermediator between the relevant SMFs and the GTP-FWs in order to reduce the amount of additional signaling traffic.

Figure 5:
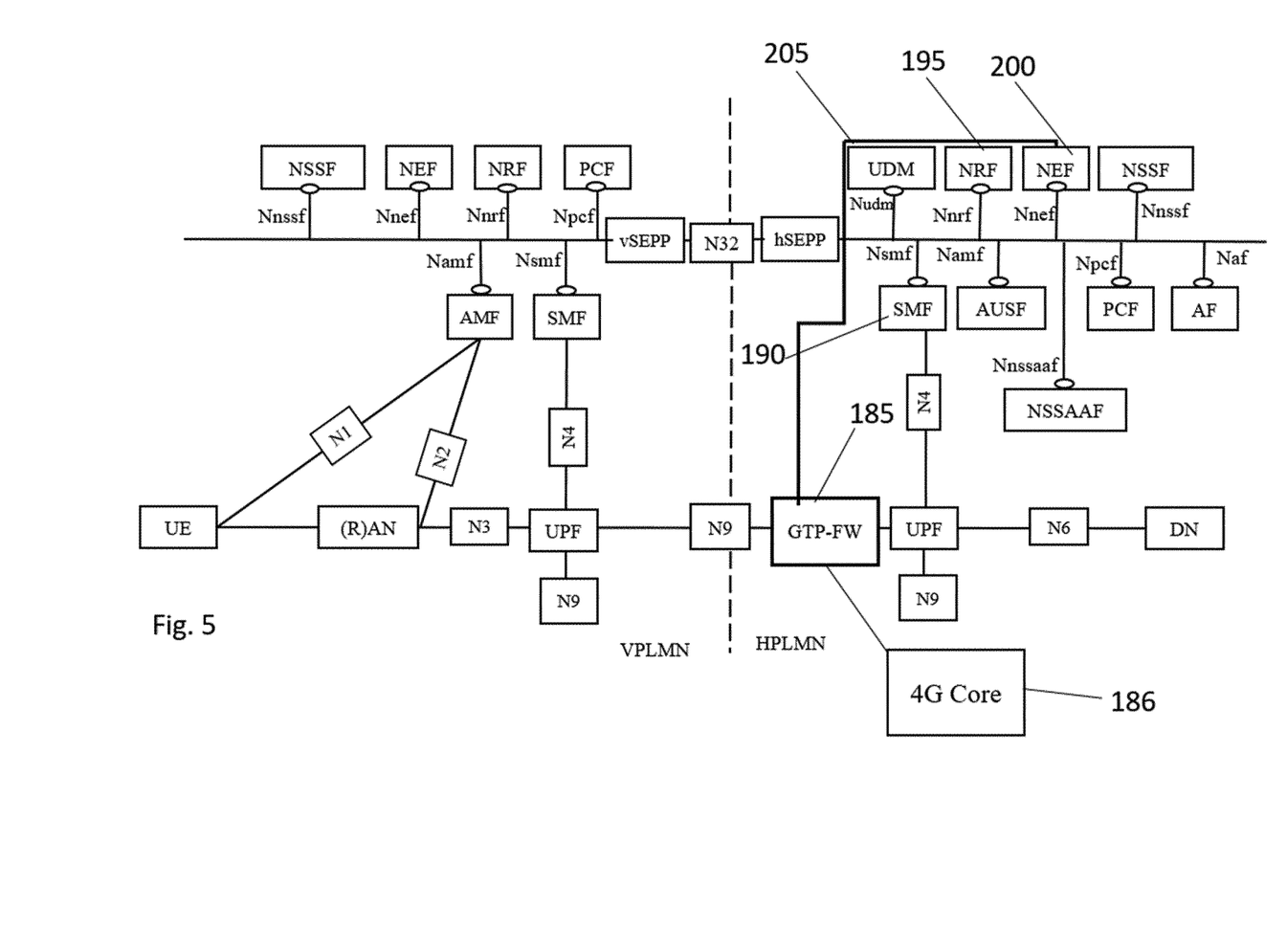
FIG. 5 shows a third embodiment of the method according to FIG. 2.

FIG. 5 shows a third embodiment of the method according to FIG. 2 within the communication system 120. FIG. 5 shows an interrogation via a NEF 200.

In this embodiment, the GTP-FW 185 interrogates with the NEF 200 via a first link 205 to get the necessary information elements such as TEID, SUPI, PLMN-ID for any new roaming connection and any termination event notification for existing roaming connections. The NEF 200 then interrogates the NRF 195 for all SMFs 190 that belong to the same network slice (S-NSSAI) and DNN which serves roaming traffic/connections, e.g. depending on parameters such as DNN, S-NSSAI, NF type. The NEF 200 will then subscribe to all SMFs 190 within the roaming slice for a notification service to get informed about the necessary information elements such as TEID, SUPI, PLMN-ID for any new roaming connection. The NEF 200 will also subscribe to all these SMFs 190 for any termination event for active roaming connection. This termination event notification shall contain the necessary information elements such as TEID, SUPI, PLMN-ID in order to identify the corresponding GTP-U connection and to terminate this connection within the GTP-FW 185.

Figure 6:
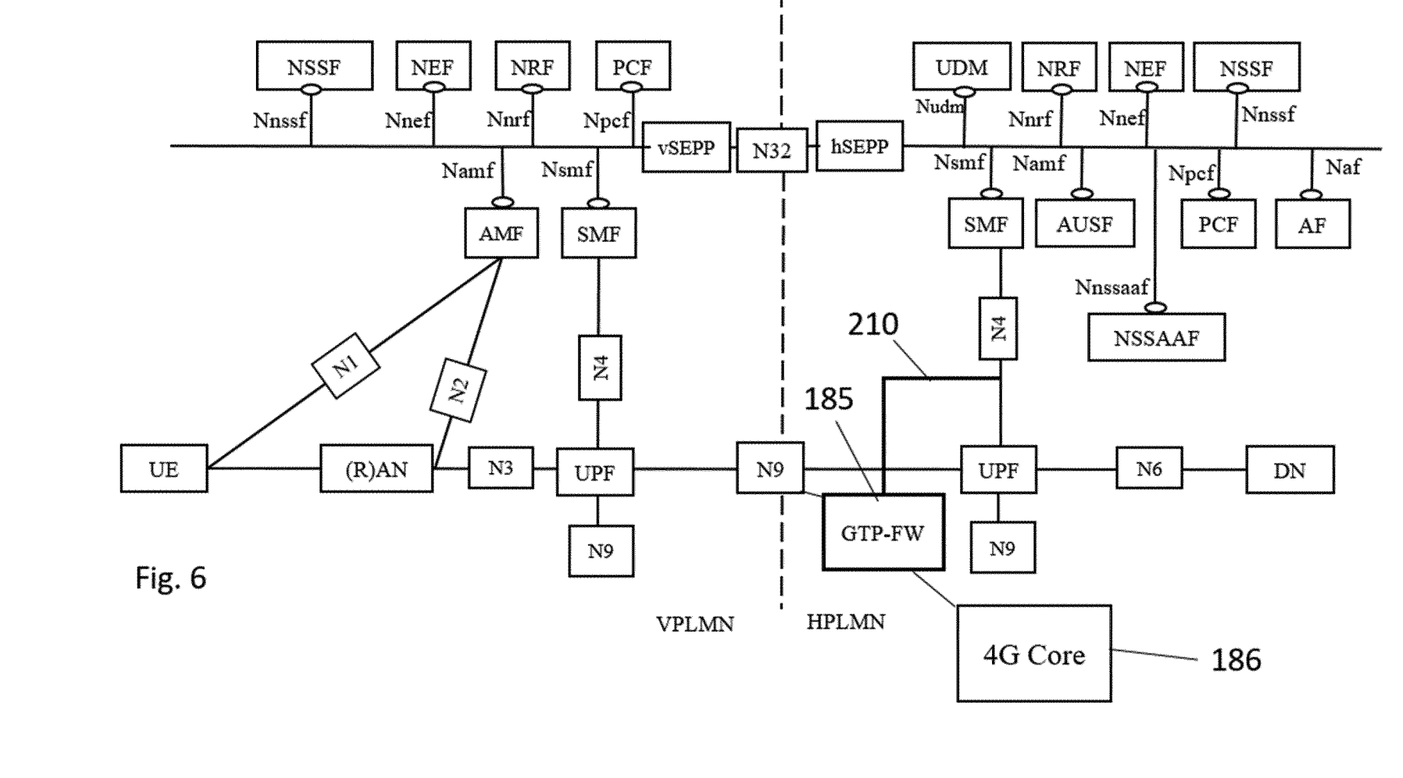
FIG. 6 shows a fourth embodiment of the method according to FIG. 2.

FIG. 6 shows a fourth embodiment of the method according to FIG. 2 within the communication system 120. FIG. 6 shows reading out an N4 interface.

In this embodiment, the GTP-FW 185 receives a copy of the complete N4 traffic (N4*) from all SMFs 190 within the roaming network slice via a second link 210 that has access to the N4 traffic. This N4* traffic is analyzed by the GTP-FW in order to get the necessary information elements such as TEID, SUPI, PLMN-ID for any new roaming connection. As a downside, this version does not provide any filtering functionality and thus leads to a huge amount of signaling traffic.

Figure 7:
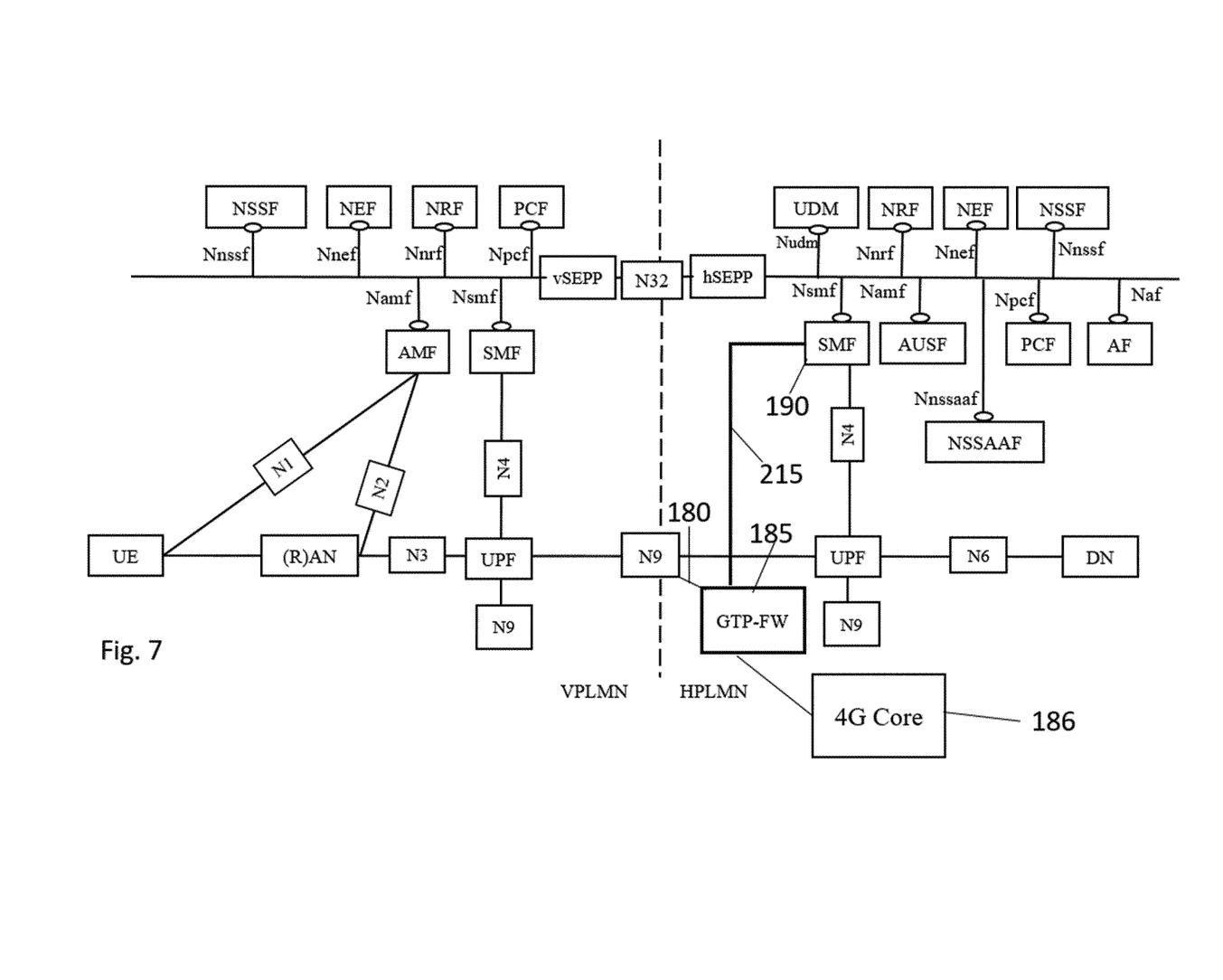
FIG. 7 shows a fifth embodiment of the method according to FIG. 2.

FIG. 7 shows a fifth embodiment of the method according to FIG. 2.

In this embodiment, the GTP-FW 185 has a direct N4 interface 215 to all SMFs 190 that facilitate the roaming traffic. In this case a new functionality of the SMF 190 is required that either sends a complete copy of the entire N4 traffic to the GTP-FW 185 or which only sends the N4 protocol elements to the GTP-FW 185 in the roaming case. The complete N4 traffic is copied and sent to the GTP-FW 185. In the case that only a subset of the N4 traffic is sent to the GTP-FW 185, this solution is still inefficient compared to the solutions of FIGS. 4 and 5 because all protocol elements need be analyzed in order to select the necessary information elements for the GTP-FW 185. In other words, the bulk of the N4 traffic is useless for the GTP-FW 185 and only a small selected portion is needed. One advantage of having all parts of the protocol available at the GTP-FW is that new security requirements that require other IEs have them available immediately and don't require the interface, whichever one, to be adapted first.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method to enable a-secure data communication between a first network of a first network provider and a second network of a second network provider,
   wherein the first network comprises at least a first part that is a 5G communication environment, wherein the second network comprises at least a first part that is a communication environment preceding the 5G communication environment, and wherein an access link to the first part of the second network comprises a GPRS Tunneling Protocol (GTP)-firewall to protect the first part of the second network,
   wherein the method comprises the following steps:
   establishing a handover process from the 5G communication environment of the first network to the non-5G first part of the second network, in particular to a 4G communication environment of the second network;
   directing control plane traffic of the data transmission from a security edge protection proxy (SEPP) of the first network to a SEPP of the second network, wherein the SEPP of the first network encrypts the data transmission and the SEPP of the second network decrypts the encrypted data transmission;
   directing user plane traffic of the data transmission to the access link to the non-5G first part of the second network and through the GTP-firewall; and
   providing the decrypted control plane traffic to the GTP-firewall, wherein the GTP-firewall performs security measures based on information extracted from the control plane traffic.

2. The method of claim 1, wherein the GTP-firewall blocks data traffic to the non-5G first part of the second network as a security measure.

3. The method of claim 1, wherein the first part of the communication environment preceding the 5G communication environment is a 2G, 3G and/or a 4G environment.

4. The method of claim 1, wherein the first network is a home public land mobile network (HPLMN) network, and the second network is a visitor public land mobile network (VPLMN) network designed for roaming use cases.

5. The method of claim 4, wherein the GTP-firewall is located at the interface between the HPLMN network and the VPLMN network.

6. The method of claim 1, wherein the first network comprises a second part that is a communication environment preceding a 5G communication environment, and/or wherein the second network comprises a second part that is a 5G communication environment.

7. The method of claim 1, wherein the GTP-firewall is implemented within the SEPP of the second network, in particular within the home SEPP (hSEPP) of the HPLMN network.

8. The method of claim 7, wherein the SEPP stores the decrypted control plane traffic within an internal database along with an associated time stamp, and wherein the GTP-firewall regularly checks new entries of that database or wherein the SEPP notifies the GTP-firewall about new entries within the database.

9. The method of claim 1, wherein a copy of N4 traffic is transmitted to the GTP-firewall.

10. The method of claim 1, wherein the GTP-firewall is provided with information elements that are a subset of the control plane traffic.

11. The method of claim 10, wherein the GTP-firewall gets the information elements that are a subset of the control plane traffic from session management functions (SMFs) that are related to traffic management from the first part of the first network to the first part of the second network.

12. The method of claim 11, wherein the GTP-firewall performs the following steps:
   registering with a service profile in a network repository function (NRF);
   asking the NRF for all SMFs that serve roaming traffic; and
   subscribing to a notification service of all SMFs that serve roaming traffic, wherein the SMFs send selected information elements to the GTP-firewall.

13. The method of claim 10, wherein the GTP-firewall gets the information elements that are a subset of the control plane traffic from a network exposure function (NEF).

14. The method of claim 4, wherein the HPLMN network and/or the VPLMN are cellular networks.

15. A communication system to enable a secure data communication between a first network of a first network provider and a second network of a second network provider,
   wherein the first network comprises at least a first part that is a 5G communication environment, wherein the second network comprises at least a first part that is a communication environment preceding the 5G communication environment, and wherein an access link to the first part of the second network with a GPRS Tunneling Protocol (GTP)-firewall to protect the first part of the second network;
   wherein the communication system is configured to perform the steps of the method of claim 1.

* * * * *